United States Patent
Choi et al.

(10) Patent No.: US 9,459,756 B2
(45) Date of Patent: Oct. 4, 2016

(54) USER TERMINAL APPARATUS, MESSAGE EXCHANGE SYSTEM, METHOD FOR DISPLAYING MESSAGE, AND METHOD FOR EXCHANGING MESSAGE

(71) Applicant: SAMSUNG ELECTRONICS CO., LTD., Suwon-si (KR)

(72) Inventors: Min-suk Choi, Suwon-si (KR); Jung-kih Hong, Seoul (KR); Lie xin Chen, GuangZhou (CN); Lin Xie, Jiang Su (CN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 303 days.

(21) Appl. No.: 13/909,263

(22) Filed: Jun. 4, 2013

(65) Prior Publication Data

US 2013/0326366 A1 Dec. 5, 2013

(30) Foreign Application Priority Data

Jun. 4, 2012 (KR) .................. 10-2012-0059654

(51) Int. Cl.
*G06F 3/0481* (2013.01)
*H04W 4/02* (2009.01)
*H04W 4/12* (2009.01)

(52) U.S. Cl.
CPC .......... *G06F 3/0481* (2013.01); *H04W 4/02* (2013.01); *H04W 4/12* (2013.01)

(58) Field of Classification Search
CPC .................................................. G06F 3/0481
See application file for complete search history.

(56) References Cited

U.S. PATENT DOCUMENTS

| 8,000,726 B2 | 8/2011 | Altman et al. |
| 2008/0119200 A1 | 5/2008 | McConnell |
| 2009/0254840 A1* | 10/2009 | Churchill et al. ............ 715/753 |
| 2011/0238762 A1* | 9/2011 | Soni et al. .................... 709/206 |
| 2013/0027429 A1* | 1/2013 | Hogg .................. G06F 17/3087 345/633 |

OTHER PUBLICATIONS

Communication, dated Oct. 15, 2013, issued by the European Patent Office in counterpart Application No. 13170526.1.
"Geochat Online Help", Jan. 25, 2011, pp. 1-14, XP055080819.

* cited by examiner

*Primary Examiner* — Peiyong Weng
(74) *Attorney, Agent, or Firm* — Sughrue Mion, PLLC

(57) ABSTRACT

A user terminal apparatus is provided. The user terminal apparatus includes: a display which displays a map indicating a location of the user terminal apparatus and a location of one other user terminal apparatus, a communicator which receives a message which is input through the one other user terminal apparatus, and a controller which, when the message is received, controls to display the message on a region corresponding to the location of the one other user terminal apparatus on the map.

20 Claims, 17 Drawing Sheets

(1)　　　　　　　　　　　(2)

FIG. 6
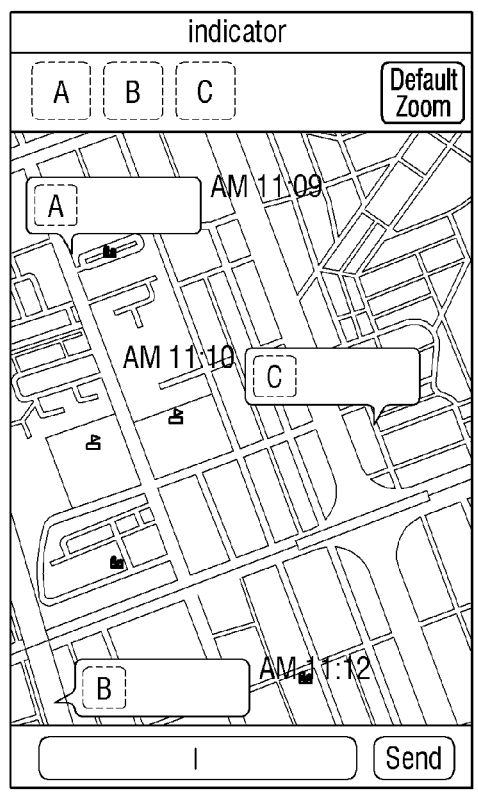
(1)
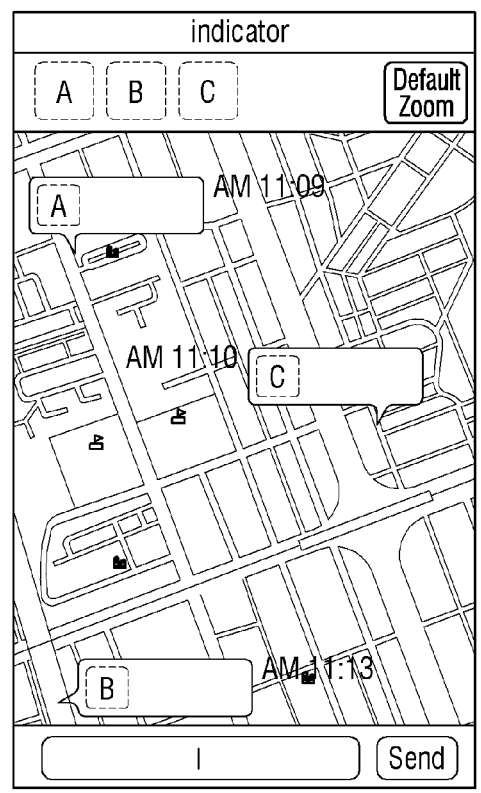
(2)

FIG. 8
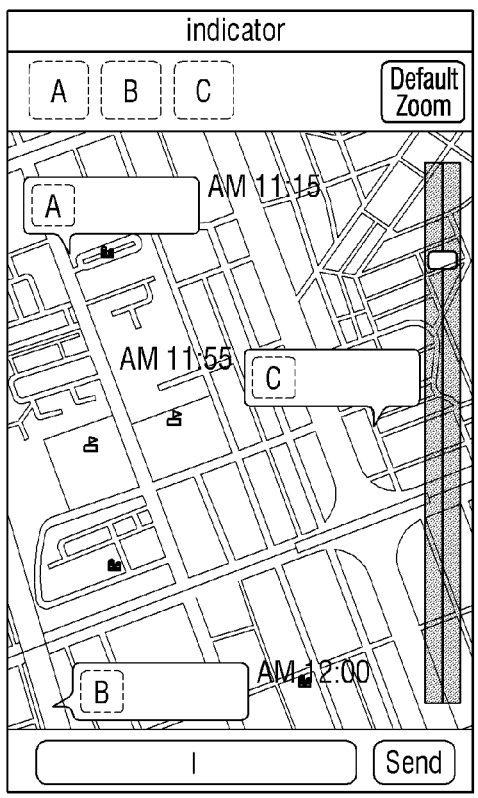
(1)
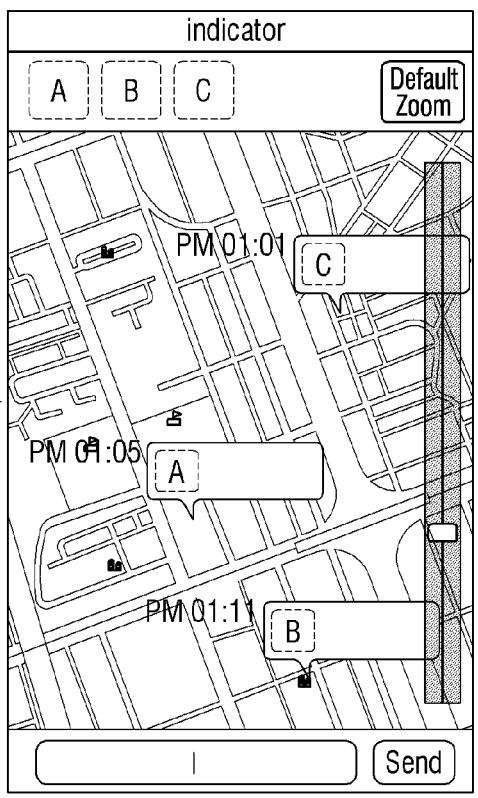
(2)

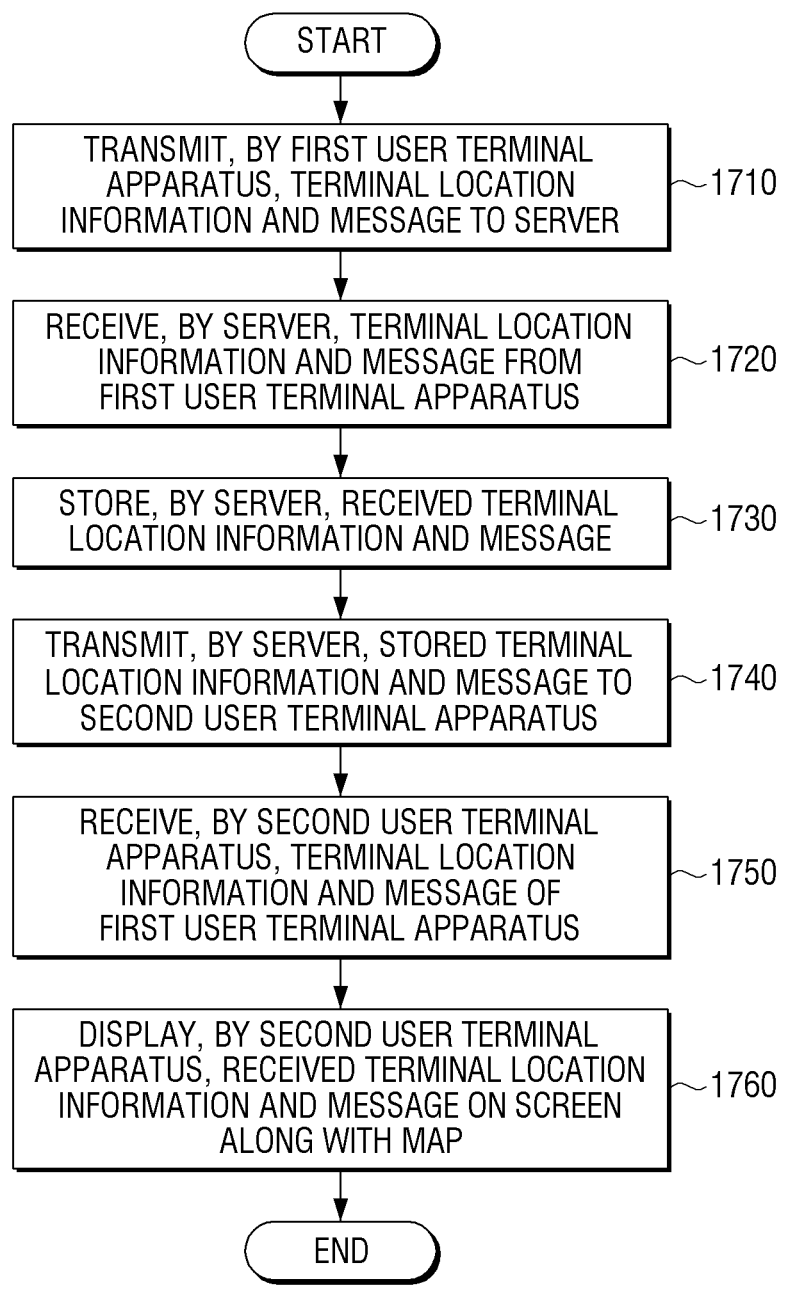

USER TERMINAL APPARATUS, MESSAGE EXCHANGE SYSTEM, METHOD FOR DISPLAYING MESSAGE, AND METHOD FOR EXCHANGING MESSAGE

CROSS-REFERENCE TO RELATED APPLICATION

This application claims priority from Korean Patent Application No. 10-2012-0059654, filed on Jun. 4, 2012 in the Korean Intellectual Property Office, the disclosure of which is incorporated herein by reference in its entirety.

BACKGROUND

1. Field

Methods and apparatuses consistent with exemplary embodiments relate to a user terminal apparatus, a message exchange system, and a method for displaying a message, and more particularly, to a user terminal apparatus which can display messages which are input through a plurality of other user terminal apparatuses, a message exchange system, a method for displaying a message, and a method for exchanging a message.

2. Description of the Related Art

As mobile terminal apparatuses such as mobile phones have been increasingly used, various kinds of mobile services have been developed and commercialized.

In particular, location-based services that can provide information a user wants in real life according to a location of a mobile terminal apparatus are in the spotlight. For example, when a user wants to find a nearby restaurant in a region where he/she is located, the user can easily search for information on nearby restaurants using the location-based service through his/her mobile terminal apparatus.

In recent years, as bandwidths of communication networks have increased and smartphones which can provide plenty of visual information through a large size display have been introduced, location-based services applying a user's experience have been developed. For example, the Google map application, which displays a map on a smartphone and displays information on locations of facilities existing in the real world and service contents on the map, is representative of the location-based services.

Separately, a traditional text message service which enables a message to be exchanged between mobile terminal apparatuses has been steadily used.

However, such a text message service is satisfactory as a means for exchanging individual information between mobile terminal apparatuses, but does not provide a function of sharing location information of users Likewise, the above-described location-based service provides information on a user's location that is necessary in real life, but does not provide a function of communicating with users of other mobile terminal apparatuses.

Accordingly, a new type of mobile service that appropriately combines a communication service for exchanging a message between mobile terminal apparatuses and the above-described location-based service may be considered. Such a service is expected to provide a new user experience by combining a social network and a virtual world providing real world information.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide a user terminal apparatus, a message exchange system, a method for displaying a message, and a method for exchanging a message, which display a map indicating locations of a plurality of user terminal apparatuses and display an input message on a region corresponding to each of the locations of the user terminal apparatuses on the map, so that a plurality of users can identify one another's locations and can exchange messages with one another.

According to an aspect of an exemplary embodiment, there is provided a user terminal apparatus including: a display configured to display a map indicating a location of the user terminal apparatus and a location of at least one other user terminal apparatus; a communicator configured to receive a message which is input through the at least one other user terminal apparatus; and a controller, when the message is received, configured to control to display the message on a region corresponding to the location of the at least one other user terminal apparatus on the map.

The user terminal apparatus may further include an user interface, and, when a message is input through the user interface, the controller may control to display the input message on a region corresponding to the location of the user terminal apparatus on the map.

The controller may determine a relative location of the at least one other user terminal apparatus with reference to the location of the user terminal apparatus, and may control to display the location of the user terminal apparatus and the location of the at least one other user terminal apparatus on the map according to the relative location.

When a zoom-in command is input through the user interface, the controller may control to zoom in on the map with reference to the location of the user terminal apparatus, and, when a zoom-out command is input through the user interface, the controller may control to zoom out on the map with reference to the location of the user terminal apparatus.

When there are a plurality of other user terminal apparatuses, and when the location of the user terminal apparatus and locations of all of the plurality of other user terminal apparatuses are displayed on the map, and when the zoom-in command is input, the controller may control to display the location of the user terminal apparatus and locations of some of the plurality of other user terminal apparatuses on the map which is magnified according to the zoom-in command, and, when the location of the user terminal apparatus and locations of some of the plurality of other user terminal apparatuses are displayed on the map, and when the zoom-out command is input, the controller may control to display the location of the user terminal apparatus and the locations of all of the plurality of other user terminal apparatuses on the map which is reduced according to the zoom-out command.

When there are a plurality of other user terminal apparatuses, and when locations of some of the plurality of other user terminal apparatuses are displayed on the map, and a message input through at least one of the other user terminal apparatuses that is not displayed on the map is received, the controller may control to display a location identifier of the at least one other user terminal apparatus and the message on a screen based on a relative location of the at least one other user terminal apparatus to the user terminal apparatus.

When the message is displayed on the map and a new message input through the at least one other user terminal apparatus is received, the controller may control to update the message displayed on the map with the new message.

The controller may control to further display at least one of user information of the one other user terminal apparatus displayed on the map, a transmission time of the input message, and a reception time of the message.

When a command to select the one other user terminal apparatus is input through the user interface, the controller may control to display the map and the message with reference to the location of the one other user terminal apparatus which is selected according to the command.

The controller may display a time moving menu on a certain region of the display, and, when the time moving menu is selected, the controller may control to display a map and a message of a predetermined point of time.

According to an aspect of another exemplary embodiment, there is provided a message exchange system, comprising: one other terminal apparatus which transmits terminal location information and a message to a server; the server which receives the terminal location information and the message from the one other terminal apparatus and stores the terminal location information and the message, and transmits the terminal location information and the message which are received from the one other user terminal apparatus and stored to a terminal apparatus; and the terminal apparatus which receives the terminal location information and the message of the one other user terminal apparatus from the server, and displays the terminal location information and the message on a screen along with a map.

The server may further transmit a reception time of the message which is received from the one other terminal apparatus and stored to the terminal apparatus, and the terminal apparatus may receive the reception time of the message from the server and displays the reception time on the screen along with the map and the received message.

According to an aspect of still another exemplary embodiment, there is provided a method for displaying a message, the method including: displaying a map indicating a location of a terminal apparatus and a location of at least one other terminal apparatus; receiving a first message which is input through the one other user terminal apparatus; and, when the message is received, displaying the first message on a region corresponding to the location of the at least one other user terminal apparatus on the map.

The method may further comprise: receiving input of a second message through the user terminal apparatus; and, when the second message is input, displaying the input second message on a region corresponding to the location of the user terminal apparatus on the map.

The method may further comprise: when a zoom-in command is input through the terminal apparatus, zooming in on the map with reference to the location of the terminal apparatus; and, when a zoom-out command is input through the terminal apparatus, zooming out on the map with reference to the location of the terminal apparatus.

When there are a plurality of other user terminal apparatuses, the zooming in or zooming out on the map may comprise, when the location of the filling terminal apparatus and locations of all of the plurality of other terminal apparatuses are displayed on the map, and the zoom-in command is input, displaying the location of the terminal apparatus and locations of some of the plurality of other user terminal apparatuses on the map which is magnified according to the zoom-in command, and, when the location of the user terminal apparatus and locations of some of the plurality of other user terminal apparatuses are displayed on the map, and the zoom-out command is input, displaying the location of the terminal apparatus and the locations of all of the plurality of other user terminal apparatuses on the map which is reduced according to the zoom-out command.

The method may further comprise, when there are a plurality of other terminal apparatuses, and when locations of some of the plurality of other terminal apparatuses are displayed on the map, and a message input through one of the other terminal apparatuses that is not displayed on the map is received, displaying a location identifier of the at least one other terminal apparatus and the message on a screen based on a relative location of the at least one other user terminal apparatus to the terminal apparatus.

The method may further comprise, when the first message is displayed on the map and a new message input through the at least one other user terminal apparatus is received, updating the message displayed on the map with the new message.

The method may further comprise: displaying a time moving menu on a certain region of a screen of the terminal apparatus, and, when the time moving menu is selected, displaying a map and a message of a predetermined point of time.

According to an aspect of still another exemplary embodiment, there is provided a method for exchanging a message, the method comprising: transmitting, by one other first terminal apparatus, terminal location information and a message to a server; receiving, by the server, the terminal location information and the message from the one other first terminal apparatus; storing, by the server, the received terminal location information and the message; transmitting, by the server, the stored terminal location information and the message to a second terminal apparatus; and receiving, by the second terminal apparatus, the terminal location information and the message of the one other first terminal apparatus from the server; and displaying, by the second terminal apparatus, the received terminal location information and the message on a screen along with a map.

According to the exemplary embodiments, the user terminal apparatus, the message exchange system, the method for displaying the message and the method for exchanging the message, which can allow several users to identify one another's locations and exchange messages with one another, are provided, so that new user experience can be provided by combining a social network and a virtual world providing real world information.

BRIEF DESCRIPTION OF THE DRAWING FIGURES

The above and/or other aspects will be more apparent by describing in detail exemplary embodiments, with reference to the accompanying drawings, in which:

FIG. 6 is a view illustrating a situation in which a message reception time is further displayed on a map;

FIG. 8 is a view illustrating a display screen which further displays a time moving menu;

FIG. 17 is a flowchart illustrating a method for exchanging a message according to an exemplary embodiment.

DETAILED DESCRIPTION OF EXEMPLARY EMBODIMENTS

Figure 1:
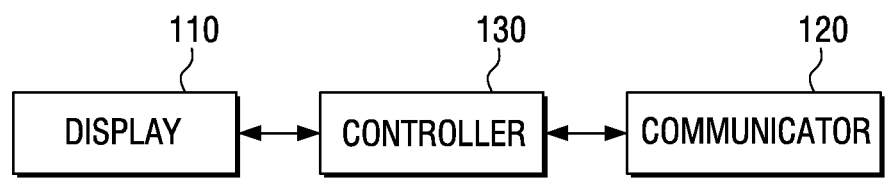
FIG. 1 is a block diagram illustrating a user terminal apparatus according to an exemplary embodiment.

Hereinafter, exemplary embodiments will be described in greater detail with reference to the accompanying drawings.

In the following description, same reference numerals are used for the same elements when they are depicted in different drawings. The matters defined in the description, such as detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

A user terminal apparatus 100 recited herein refers to a mobile apparatus that transmits and receives information through at least one communication network. For example, the user terminal apparatus 100 may include a 2G, 3G, or 4G mobile phone, a smartphone, a tablet personal computer (PC), a laptop computer, a personal digital assistant (PDA), and all other kinds of apparatuses that users can carry.

One other user terminal apparatus 200 refers to a user terminal apparatus that is owned by a user other than the user of the user terminal apparatus 100. However, one other user terminal apparatus 200 does not mean all user terminal apparatuses except the user terminal apparatus 100 and is limited to a user terminal apparatus that exchanges a message with the user terminal apparatus 100. There may be a plurality of other user terminal apparatuses. In this case, each of the plurality of other user terminal apparatuses 200 exchanges a message with the user terminal apparatus 100.

Figure 2:
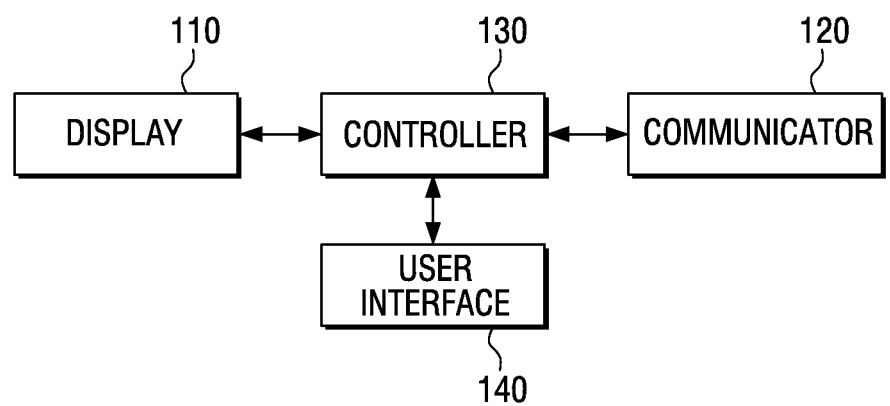
FIG. 2 is a block diagram illustrating a user terminal apparatus according to another exemplary embodiment.
Figure 3:
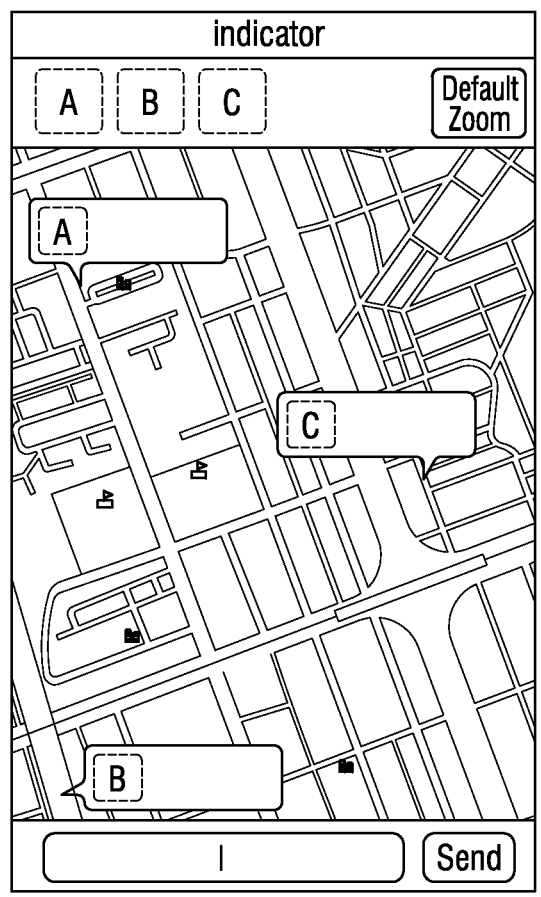
FIG. 3 is a view illustrating a display screen of the user terminal apparatus of FIG. 2.

FIG. 1 is a block diagram illustrating a user terminal apparatus 100 according to an exemplary embodiment, FIG. 2 is a block diagram illustrating a user terminal apparatus 100 according to another exemplary embodiment, and FIG. 3 is a view illustrating a screen of the user terminal apparatus 100 of FIG. 2.

As shown in FIG. 1, the user terminal apparatus 100 according to an exemplary embodiment includes a display 110, a communicator 120, and a controller 130.

The display 110 displays a variety of information. More specifically, when the controller 130, which will be described in detail below, converts data which has been input to the user terminal apparatus 100 into image data that is visually recognizable, the display 110 applies appropriate voltage to a display panel according to the processed image data and displays information. To achieve this, the display 110 may include a display panel and a voltage driver. However, the detailed configuration of the display 110 is not directly relevant to the technical features of the present disclosure and is well known to an ordinary skilled person in the related art. Therefore, a detailed description thereof is omitted.

In particular, the display 110 displays a map indicating a location of the user terminal apparatus 100 and a location of one other user terminal apparatus 200 on the display panel.

The map is a drawing that shows some or all states of the earth surface on a plane using symbols, characters or pictures on a reduced scale. However, besides the earth surface, the map may show a predetermined space existing in real life such as a specific building.

According to an exemplary embodiment, information indicating where the user terminal apparatus 100 and other terminal apparatuses are currently located may be displayed on the map displayed on the display panel as shown in FIG. 3. That is, the display 110 may configure a map which displays layout states of buildings and roads of a predetermined region on a reduced scale, and may display the map, and also, may display information for identifying users such as users' photos on points on the map corresponding to points at which the user terminal apparatus 100 and other user terminal apparatuses are located in relation to one another.

Since a specific point on the map corresponds to a specific point of the real world as described above, the location of the user terminal apparatus 100 or other user terminal apparatuses in the real world should be determined in order to display the location of the user terminal apparatus 100 or other user terminal apparatuses at specific points on the map.

There is no limit to the method for determining location information. The location information may be determined using a global positioning system (GPS) method, a cell method, and a short distance communication method, and may be transmitted through a long distance communication network or a short distance communication network. The GPS method refers to a method that grasps the location of the user terminal apparatus 100 using an artificial satellite (not shown), and can identify an exact location in a relatively wide range. However, this method cannot implement precise location-tracking such as distinguishing between an interior and an exterior of a building. In this case, the cell method which grasps the location of the user terminal apparatus 100 using a repeater (not shown) complements the GPS method such that precise location information can be obtained. Various location determination technologies need to be used complexly in order to obtain detailed location information of the user terminal apparatus 100. For example, when a user is located in a conference room on the $8^{th}$ floor of a building A which is located in front of Seoul National University of Education, the GPS method identifies that the user is located in the building A and the cell method identifies that the user is located in the conference room on the $8^{th}$ floor. To determine the location more precisely, near field communication (NFC) may be used. However, in embodying the present disclosure, various location determination technologies may be used besides the above-described location determination technologies and the present disclosure does not exclude these exemplary embodiments.

The communicator 120 communicates with an external apparatus. More specifically, the communicator 120 may transmit a message to a server 300 or one other user terminal apparatus 200, or may receive a message from the server 300 or one other user terminal apparatus 200.

The communicating method of the communicator 120 has no limit and includes long distance communication and short distance communication. In the former case, the user terminal apparatus 100 communicates with one other user terminal apparatus, which is located in a long distance region, through the server 300. In the latter case, the user terminal apparatus 100 may directly communicate with one other user terminal apparatus in a Bluetooth method. That is, when the communicator 120 is implemented by using a Bluetooth communication module, the user terminal apparatus 100 communicates with one other user terminal apparatus 200 according to a Bluetooth communication standard, and exchanges a transport packet with one other user terminal apparatus 200. However, the present disclosure does not exclude other short distance communicating means such as Zigbee. The communicator 120 may include a transmitter (not shown) to transmit information and a receiver (not shown) to receive information.

The message refers to information that is written in a language or symbol suitable for transmission by communication, or transmitted information. The information has no limit to its amount and may be all kinds of transmittable data such as text data, image file, and a moving image file. For example, the message may be a sentence that is written in a language of a text format (for example, English).

The controller 130 controls an overall operation of the user terminal apparatus 100 according to an exemplary embodiment, and may be a processor from the hardware perspective and may be an operating system (OS) to control hardware operations or a software module to achieve a specific object from the software perspective. The controller 130 may include two or more of the processor, the OS, and the software module.

In particular, when a message is received, the controller 130 may control the display 110 to display the received message on a region corresponding to a location of one other user terminal apparatus 200 on the map.

According to an exemplary embodiment, one other user terminal apparatus 200 may transmit the input message along with an identifier. At this time, the server 300 may receive the message and the identifier. The server 300 stores the received message in a database along with the identifier of one other user terminal apparatus 200, and transmits the message and the identifier to the user terminal apparatus 100. The user terminal apparatus 100 receives the message and the identifier which are transmitted from the server 300, and the controller 130 of the user terminal apparatus 100, which has received the message and the identifier, identifies one other user terminal to which the message has been input with reference to the identifier, and controls the display 110 to display the message on the region corresponding to the location of one other user terminal apparatus 200 on the map.

In this case, the user terminal apparatus 100 may receive location information of one other user terminal apparatus 200 in addition to the identifier and the message. That is, since the location information of one other user terminal apparatus 200 may change minute by minute according to movements of the user that owns one other user terminal apparatus 200, the server 300 may need to directly receive the location information from one other user terminal apparatus 200. At this time, the location information may be real location information of one other user terminal apparatus 200 to be mapped onto a location on the map (for example, coordinates of longitude and latitude calculated by a GPS module of one other user terminal apparatus 200), but, may be information for calculating such real location information (for example, information on a repeater which senses a signal of one other user terminal apparatus 200). The sever 300 transmits the location information of one other user terminal apparatus 200 to the user terminal apparatus 100. The user terminal apparatus 100 identifies or readjusts the location of one other user terminal apparatus 200 on the map based on the location information of one other user terminal apparatus 200, and displays the received message on a region corresponding to the current location of one other user terminal apparatus 200 according to a result of the identifying or readjusting.

According to another exemplary embodiment, the user terminal apparatus 100 may directly receive the message and the identifier of one other user terminal apparatus 200. The controller 130 of the user terminal apparatus 100 identifies one other user terminal apparatus 200 to which the message has been input with reference to the identifier, and may control the display 110 to display the message on a region corresponding to the location of one other user terminal apparatus 200 on the map.

In this case, the user terminal apparatus 100 may receive the location information of one other user terminal apparatus 200 in addition to the identifier and the message in the same way as in the above-described exemplary embodiment. That is, since the location information of one other user terminal apparatus 200 changes minute by minute according to movements of the user that owns one other user terminal apparatus 200, the user terminal apparatus 100 may need to directly receive the location information of one other user terminal apparatus 200. At this time, the location information may be real location information of the one other user terminal apparatus 100 to be mapped onto a location on the map (for example, coordinates of longitude and latitude calculated by a GPS module of one other user terminal apparatus 200), but, the location information may also be information for calculating such real location information (for example, information on a repeater which senses a signal of one other user terminal apparatus 200). The user terminal apparatus 100 identifies or readjusts the location of one other user terminal apparatus 200 on the map based on the location information of the one other user terminal apparatus 200, and displays the received message on a region corresponding to the current location of one other user terminal apparatus 200 according to a result of the identifying or readjusting.

The region corresponding to the location of one other user terminal apparatus 200 on the map does not necessarily refer to an exact point corresponding to the actual location of one other user terminal apparatus 200 on the map. That is, the region may be located away from the exact point on the map corresponding to the actual location of one other user terminal apparatus 200 by a predetermined distance, or may be a region including that point on the map. This is a compromise that is made because the display 110 has a limited size and thus is not able to display a map having the same scale as in the real world, but the message displayed on the display 110 should be large enough that it can be recognized.

However, a location identifier may also be displayed to indicate that the message arises from that point on the map. As a result, the message may be displayed in a speech bubble form as shown in FIG. 3.

According to the exemplary embodiments described above, the user of the user terminal apparatus 100 can identify the location of one other user terminal apparatus 200 on the map through the user terminal apparatus 100, and can receive a message.

Referring to FIG. 2, the user terminal apparatus 100 according to another exemplary embodiment may further include an user interface 140.

The user interface 140 is configured to receive data from the user of the user terminal apparatus 100, and may include a manipulator (not shown) and a transmitter (not shown).

The manipulator (not shown) is configured in order for the user to manipulate the user terminal apparatus 100 to input data to the user terminal apparatus 100, and may be a key pad or a touch screen for example. In this case, when the user inputs a message, the user may write a sentence by pressing the key pad or by touching the touch screen with reference to a virtual keyboard displayed on the display 110.

The transmitter (not shown) is configured to transmit a manipulation input signal of the user terminal apparatus input through the manipulator (not shown) to the controller 130.

At this time, when a message is input through the user interface 140, the controller 130 may control to display the message on a region corresponding to the location of the user terminal apparatus 100 on the map. The user terminal apparatus 100 identifies or readjusts the location of the user terminal apparatus 100 on the map based on the location information and displays the message on a region corresponding to the current location of the user terminal apparatus 100 according to a result of the identifying or readjusting.

In an exemplary embodiment in which the server 300 is provided, the message which is input through the user terminal apparatus 100 may be transmitted to the server 300 along with an identifier of the user terminal apparatus 100. The server 300 may store the transmitted information in the database and may transmit the information to one other user terminal apparatus 200. One other user terminal apparatus 200 receives the message and the identifier and displays the message on a region corresponding to the location of the user terminal apparatus 100 on the map displayed on a display screen.

In this case, the user terminal apparatus 100 may transmit the location information of the user terminal apparatus 100 to the server 300 in addition to the identifier and the message. That is, since the location information of the user terminal apparatus 100 changes minute by minute according to movements of the user that owns the user terminal apparatus 100, the server 300 may need to directly receive the location information from the user terminal apparatus 100. At this time, the location information may be real location information of the user terminal apparatus 100 to be mapped onto a location on the map (for example, coordinates of longitude and latitude calculated by a GPS module of the user terminal apparatus 100), but, also may be information for calculating such real location information (for example, information on a repeater which senses a signal of the user terminal apparatus 100). One other user terminal apparatus 200 identifies or readjusts the location of the user terminal apparatus 200 on the map based on the location information of the user terminal apparatus 100, and displays the received message on a region corresponding to the current location of the user terminal apparatus 100 according to a result of the identifying or readjusting.

According to another exemplary embodiment, the controller 130 may determine a relative location of at least one other user terminal apparatus with reference to the location of the user terminal apparatus 100, and may control the display 110 to display the location of the user terminal apparatus 100 and the location of the at least one other user terminal apparatus on the map according to the relative location.

This exemplary embodiment may lead to efficient calculation. For example, when the user terminal apparatus 100 and one other user terminal apparatus 200 are located far away from each other in the real world, the process of determining the actual location of each apparatus and mapping it onto the map may require complicated calculation because the actual coordinates should be converted into coordinates on the map. However, in the exemplary embodiment in which only the relative location is determined with reference to the location of the user terminal apparatus 100, coordinates of the user terminal apparatus 100 are converted into coordinates on the map, the actual location of one other user terminal apparatus 200 is determined, and the distance between the user terminal apparatus 100 and one other user terminal apparatus is determined, such that only the relative location is determined and displayed on the map without mapping coordinates separately, and thus calculation can be simplified.

Figure 4:
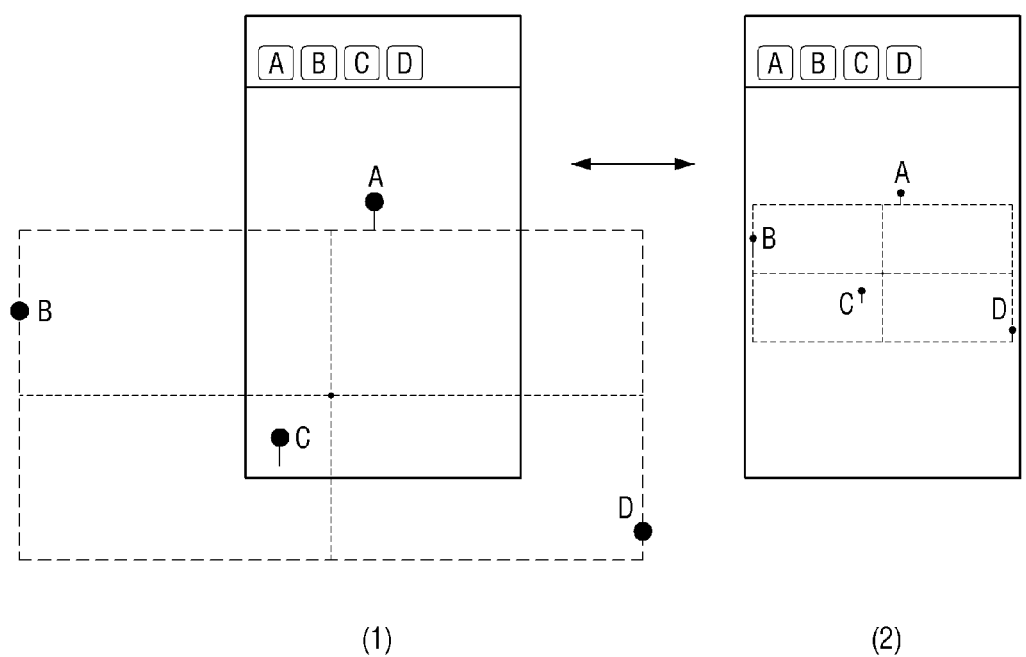
FIG. 4 is a view illustrating a display screen when a zoom-in command or a zoom-out command is input.

Hereinafter, still another exemplary embodiment in which the map is zoomed in or out will be explained with reference to FIG. 4.

According to still another exemplary embodiment, when a zoom-in or zoom-out command is input through the user interface 140, the controller 130 of the user terminal apparatus 100 controls the display 110 to zoom in or out on the map with reference to the location of the user terminal apparatus.

Zoom refers to a function of magnifying or reducing the scale of the map. That is, the zoom-in command is to magnify the map with reference to a certain point on the map displayed by the display 110 and increase the scale of the map, and the zoom-out command is to reduce the map with reference to a certain point on the map displayed by the display 110 and reduce the scale of the map.

When the zoom-in command is input through the user interface 140, the controller 130 controls to zoom in on the map with reference to the location of the user terminal apparatus. On the other hand, when the zoom-out command is input through the user interface 140, the controller 130 controls to zoom out on the map with reference to the location of the user terminal apparatus.

When the manipulator of the user terminal apparatus 100 is implemented by using a touch screen, the user may input the zoom-in command by touching two different points on the map and then dragging (slide touching) user's fingers further apart, and may input the zoom-out command by touching two different points and dragging user's fingers closer together. In this case, a degree of zoom-in or zoom-out may be determined according to a degree of dragging, that is, a rate of change from a distance between two points where the user initially touches to a distance between two points where the user raises fingers.

When there are a plurality of other user terminal apparatuses 200, and when the location of the user terminal apparatus 100 and the locations of all of the other user terminal apparatuses 200 are displayed on the map, and the zoom-in command is input, the location of the user terminal apparatus 100 and locations of some of the other user terminal apparatuses 200 are displayed on the map which is magnified according to the zoom-in command. However, if the scale of the map is small and the relative distance of the user terminal apparatus 100 is close, the location of the user terminal apparatus 100 and the locations of all of the other user terminal apparatuses 200 may be displayed on the map even when the zoom-in command is input.

On the other hand, when the location of the user terminal apparatus 100 and locations of some of the other user terminal apparatuses 200 are displayed on the map, and the zoom-out command is input, the location of the user terminal apparatus 100 and the locations of all of the other user terminal apparatuses 200 may be displayed on the map which is reduced according to the zoom-out command. However, if the scale of the map is large and the relative distance of the user terminal apparatus 100 is long, the location of the user terminal apparatus 100 and locations of some of the other user terminal apparatuses 200 may be displayed on the map even when the zoom-out command is input. View (1) of FIG. 4 illustrates the map which is magnified according to the zoom-in command, and view (2) of FIG. 4 illustrates the map which is reduced according to the zoom-out command.

According to still another exemplary embodiment, when locations of some of the plurality of other user terminal apparatuses 200 are displayed on the map, and a message which is input through one of the other user terminal apparatus that is not displayed on the map is received, the controller 130 of the user terminal apparatus 100 may control the display 110 to display a location identifier and the message on a corresponding region of the screen based on a relative location of the one of the other user terminal apparatuses 200 through which the message is input.

Figure 5:
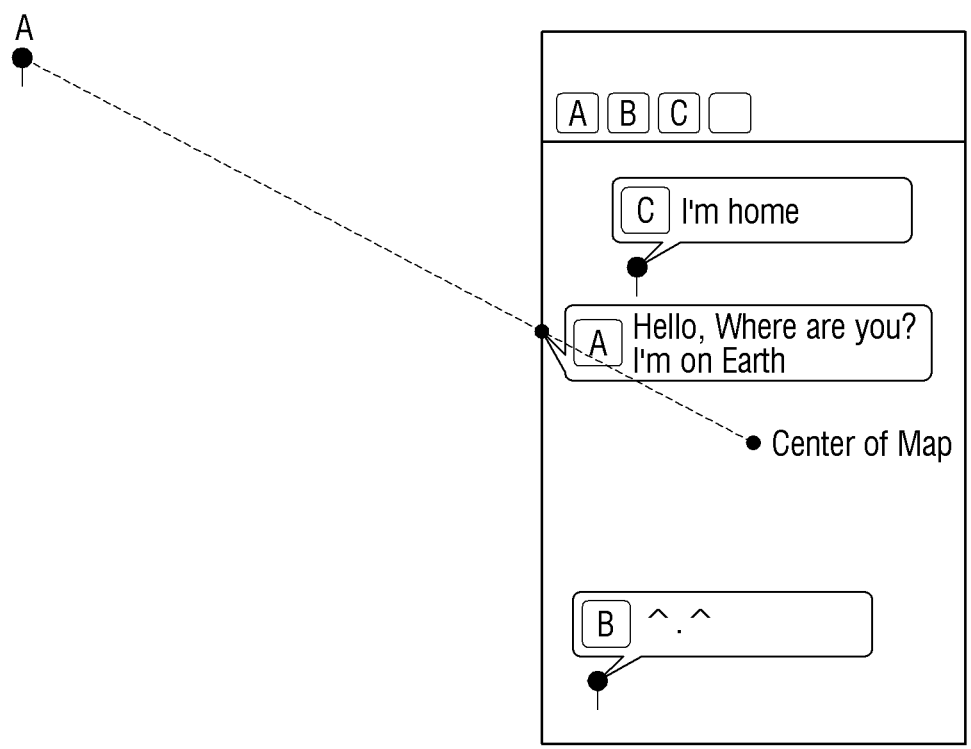
FIG. 5 is a view illustrating a display screen which displays a message of one other user terminal apparatus that is not displayed on a map.

Referring to FIG. 5, one other user terminal apparatus A 200 is not displayed on the map and one other user terminal apparatus C 200 is displayed on the map. When a message "Hello, Where are you? I'm on Earth" is input through the user terminal apparatus A, the message should be displayed on a region corresponding to the location of the user terminal apparatus A in principle. However, since the user terminal apparatus A is not displayed on the map, determining where the message is displayed is a problem. In this case, the message may be displayed on a corresponding region on the screen based on a relative location of the user terminal apparatus A through which the message is input. For example, a virtual location of the user terminal apparatus A may be determined based on the map of a current scale and the message may be displayed on a region where a line connecting a center of the map and the virtual location meets an edge of the screen. At this time, a location identifier of a conical shape pointing the virtual location may be displayed in order to inform that the user terminal apparatus A is not displayed on the map.

According to still another exemplary embodiment, when a message is displayed on the map and a new message is received through one other user terminal apparatus 200, the controller 130 of the user terminal apparatus 100 may update the message displayed on the map with the new message.

View (1) of FIG. 6 illustrates a case in which a message of one other user terminal apparatus B 200 is received and displayed. When a new message is input through the user terminal apparatus B and is received by the user terminal apparatus 100, the message of the user terminal apparatus B on the map is replaced with the new message as shown in view (2) of FIG. 6. In this case, as shown in FIG. 6, a transmission time of the input message or a message reception time of the user terminal apparatus 100 is displayed so that the order of messages can be identified. This will be described in detail below. Also, although not shown, the order of messages may be identified by assigning numbers such as 1, 2, and 3 in chronological order of messages.

According to still another exemplary embodiment, the user terminal apparatus 100 may control to further display at least one of user information of one other user terminal apparatus 200 displayed on the map, a transmission time of an input message and a message reception time of the user terminal apparatus 100.

The user information of one other user terminal apparatus 200 refers to information indicating an identity or a characteristic of the user who uses one other user terminal apparatus 200. For example, the user information may be at least one of a user's name, ID, nickname, phone number, and profile.

The transmission time of the input message refers to a time at which the message input through one other user terminal apparatus 200 is transmitted from one other user terminal apparatus 200 or a time at which the message is transmitted from the server 300.

The message reception time of the user terminal apparatus 100 refers to a time at which the user terminal apparatus 100 receives the message of one other user terminal apparatus 200 from the server 300.

Besides these, a time at which the server 300 receives the message from one other user terminal apparatus 200 may further displayed.

The user of the user terminal apparatus 100 may wish to obtain information on a neighborhood of one other user terminal apparatus 200 or information on locations of nearby other user terminal apparatuses 200. In this case, the user may input a command to select one other user terminal apparatus 200 through the user interface 140, and the controller 130 may control to display a map and a message with reference to a location of one other user terminal apparatus which is selected according to the command.

Figure 7:
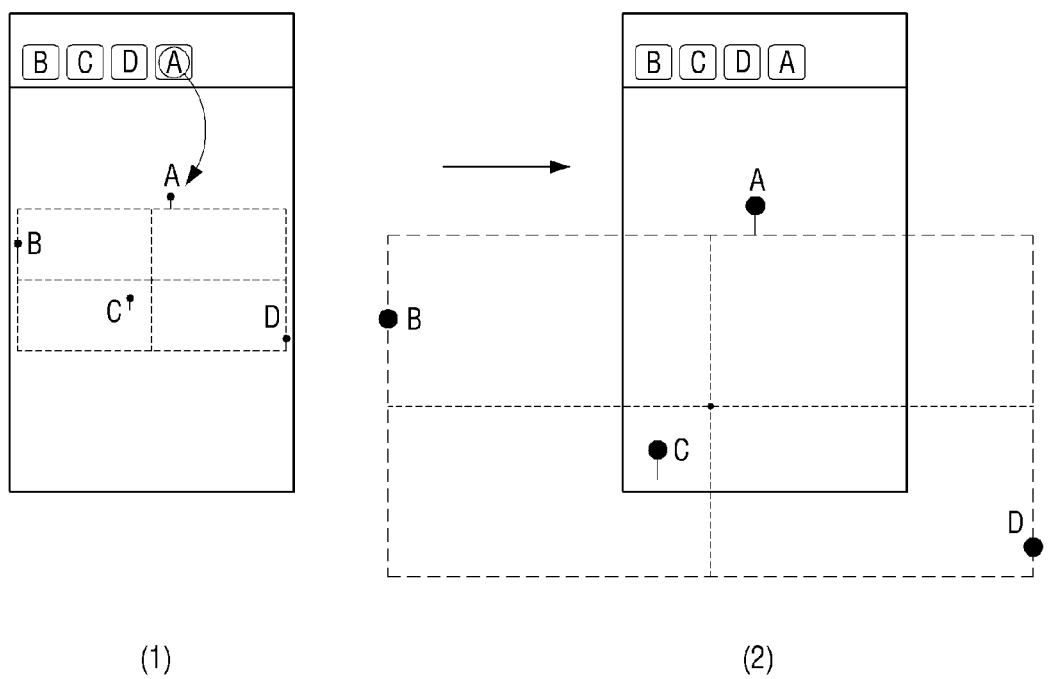
FIG. 7 is a view illustrating a display screen when one other user terminal apparatus is selected.

In an exemplary embodiment in which the manipulator (not shown) is a touch screen, the user of the user terminal apparatus 100 may input a selection command by touching one other user terminal apparatus A 200 as shown in view (1) of FIG. 7. In this case, a map and a message may be displayed with reference to the user terminal apparatus A as shown in view (2) of FIG. 7.

According to still another exemplary embodiment, the controller 130 of the user terminal apparatus 100 may display a time moving menu on a certain region of the display 110, and, when the time moving menu is selected, may control to display a map and a message of a predetermined point of time.

As described above, since the user terminal apparatus 100 displays a message which is input through one other user terminal apparatus 200 on the map with time, a message of a predetermined point of time in the past should be identified even after a predetermined time elapses.

In the exemplary embodiment in which the manipulator is a touch screen, the controller 130 may display a time moving bar on a certain region of the display 110, and the user may move to a predetermined time of the past with reference to a current time by touching the bar and dragging up and down. For example, the controller 130 may display a map which was displayed with the locations of the user terminal apparatus and one other user terminal apparatus six hours ago, and a message on the map.

Hereinafter, a message exchange system according to still another exemplary embodiment will be explained.

Figure 9:
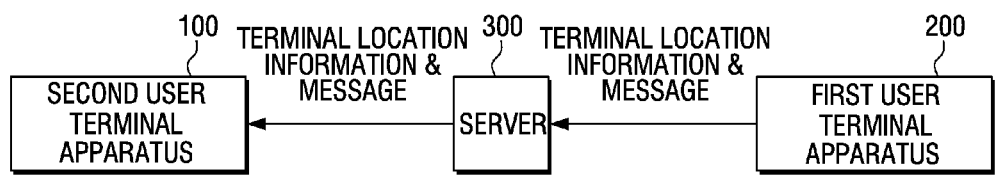
FIG. 9 is a block diagram illustrating a message exchange system according to an exemplary embodiment.

FIG. 9 is a block diagram illustrating a message exchange system.

Referring to FIG. 9, the message exchange system according to still another exemplary embodiment includes one other user terminal apparatus 200, a server 300, and a user terminal apparatus 100.

One other user terminal apparatus 200 is configured to transmit terminal location information and a message to the server 300. This detailed function has been described above.

The server 300 receives the terminal location information and the message from one other user terminal apparatus and stores the same, and transmits the terminal location information and the message which have been received from one other user terminal apparatus 200 and stored, to the user terminal apparatus 100. Accordingly, the server 300 may include a storage and may also receive an identifier of one other user terminal apparatus 200 as described above. The storage may store the identifier, the terminal location information, and the message of one other user terminal apparatus 200 in a database format.

The user terminal apparatus 100 is configured to receive the terminal location information and the message of one other user terminal apparatus 200 from the server 300 and display the same on a screen along with a map. The user terminal apparatus 100 has been described above and thus a detailed description thereof is omitted.

The server 300 may further transmit a reception time of the message which has been received from one other user terminal apparatus 200 and stored to the user terminal apparatus 100, and the user terminal apparatus 100 may receive the reception time of the message of one other user terminal apparatus 200 from the server 300 and may display the reception time on the screen along with the map and the message.

Hereinafter, a method for displaying a message and a method for exchanging a message according to an exemplary embodiment will be explained with reference to FIGS. 10 to 17.

Figure 10:
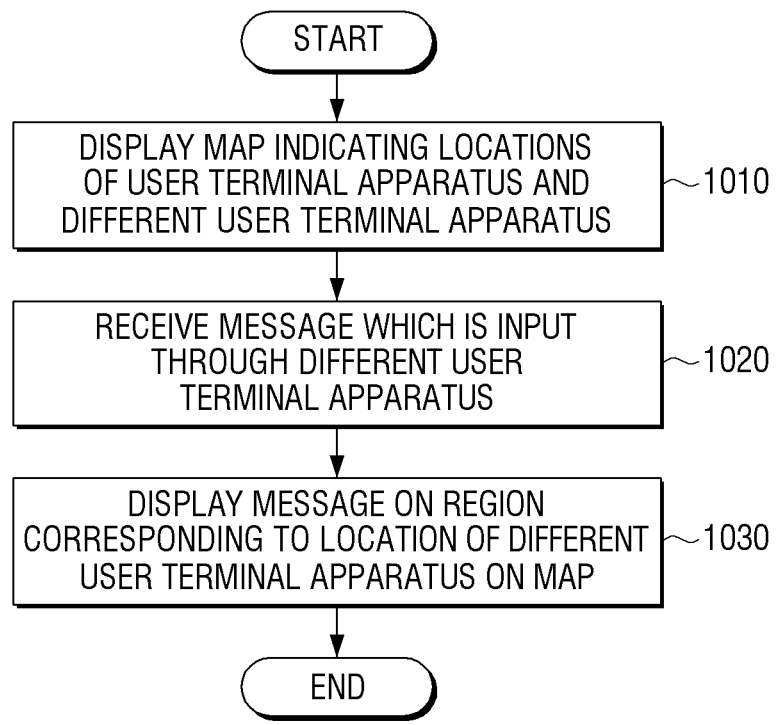
FIGS. 10 to 16 are flowcharts illustrating a method for displaying a message according to various exemplary embodiments.

Referring to FIG. 10, a method for displaying a message according to an exemplary embodiment includes: displaying a map indicating a location of a user terminal apparatus and a location of one other user terminal apparatus (S1010), receiving a message which is input through one other user terminal apparatus (S1020), and, upon receiving the message, displaying the message on a region corresponding to the location of one other user terminal apparatus on the map (S1030).

Figure 11:
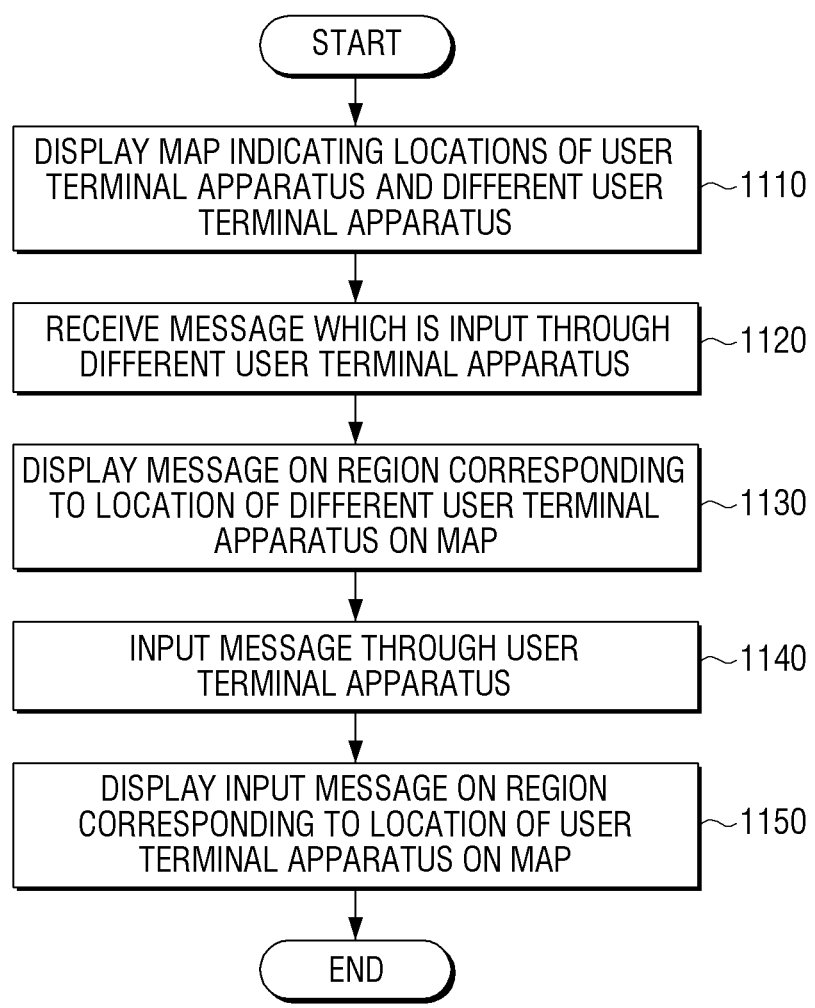

Referring to FIG. 11, the method may further include receiving input of a message through the user terminal apparatus (S1140), and displaying the input message on a region corresponding to the location of the user terminal apparatus on the map (S1150).

Figure 12:
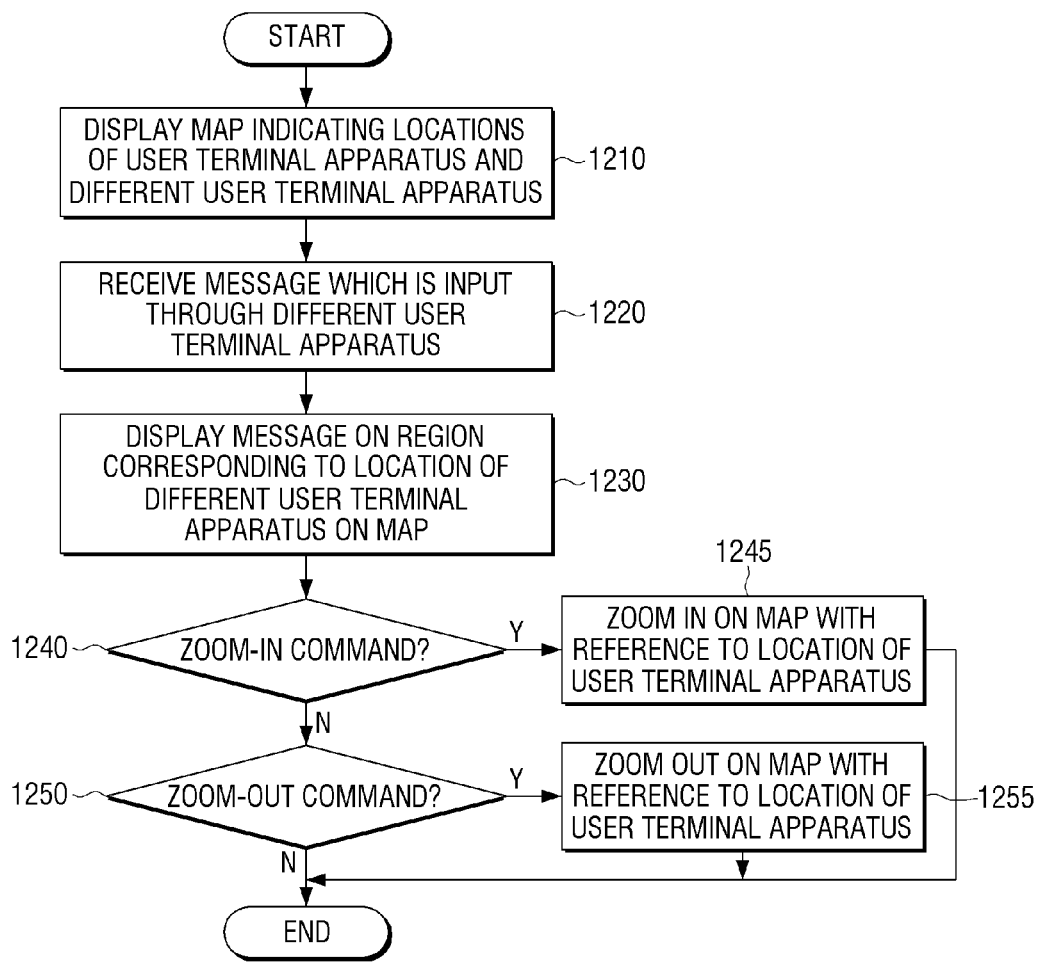

Referring to FIG. 12, the method may further include, when a zoom-in command is input through the user terminal apparatus (S1240), zooming in on the map with reference to the location of the user terminal apparatus (S1245), and, when a zoom-out command is input through the user terminal apparatus (S1250), zooming out on the map with reference to the location of the user terminal apparatus (S1255).

Figure 13:
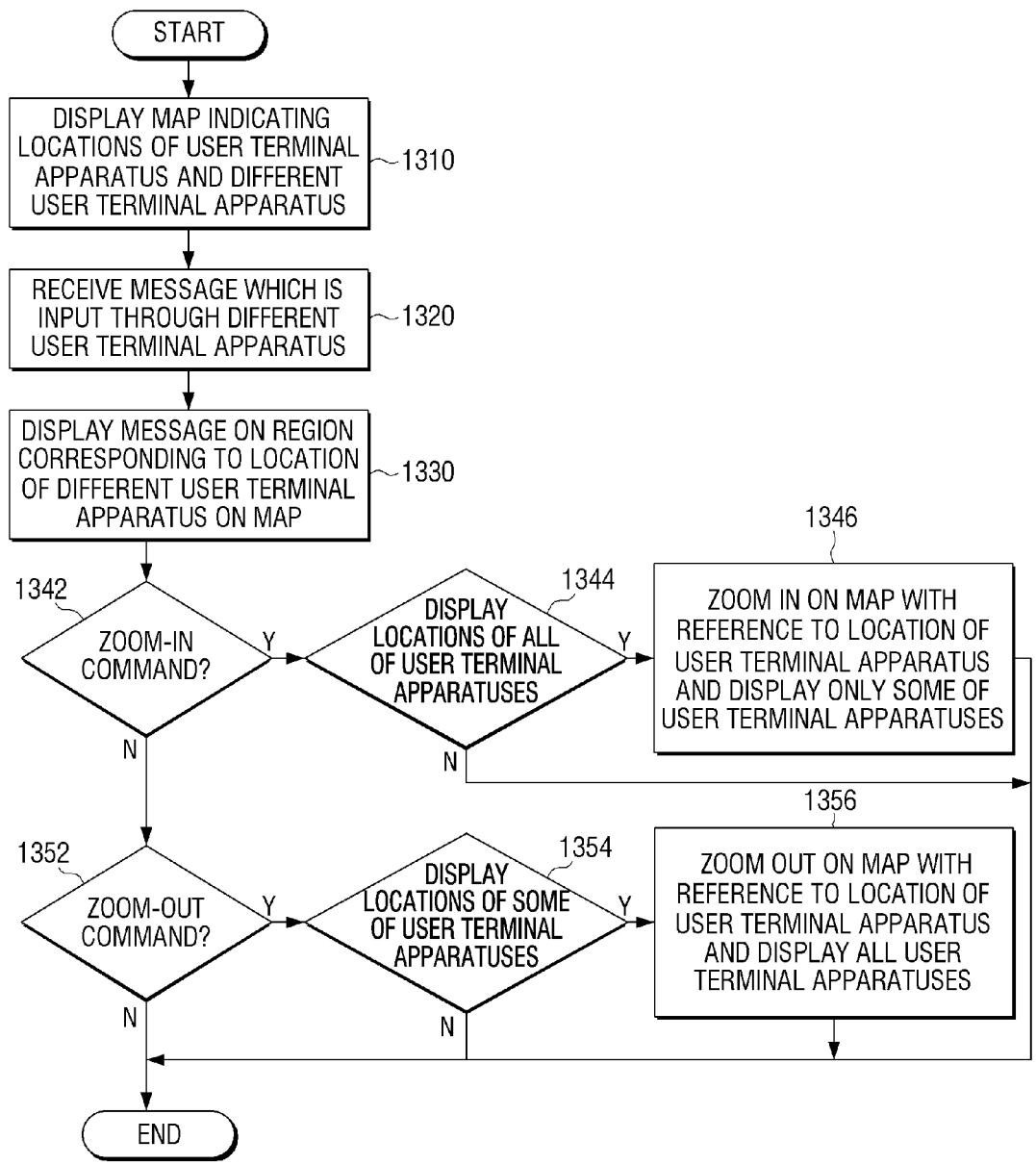

Referring to FIG. 13, when there are a plurality of other user terminal apparatuses, the zooming in or zooming out may include: when the location of the user terminal apparatus and the locations of all of the plurality of other user terminal apparatuses are displayed on the map (S1344), and the zoom-in command is input (S1342), displaying the location of the user terminal apparatus and locations of some of the plurality of other user terminal apparatuses on the map which is magnified according to the zoom-in command (S1346), and, when the location of the user terminal apparatus and locations of some of the plurality of other user terminal apparatuses are displayed on the map (S1354), and the zoom-out command is input (S1352) in the state in which, displaying the location of the user terminal apparatus and the locations of all of the plurality of other user terminal apparatuses on the map which is reduced according to the zoom-out command (S1356).

Figure 14:
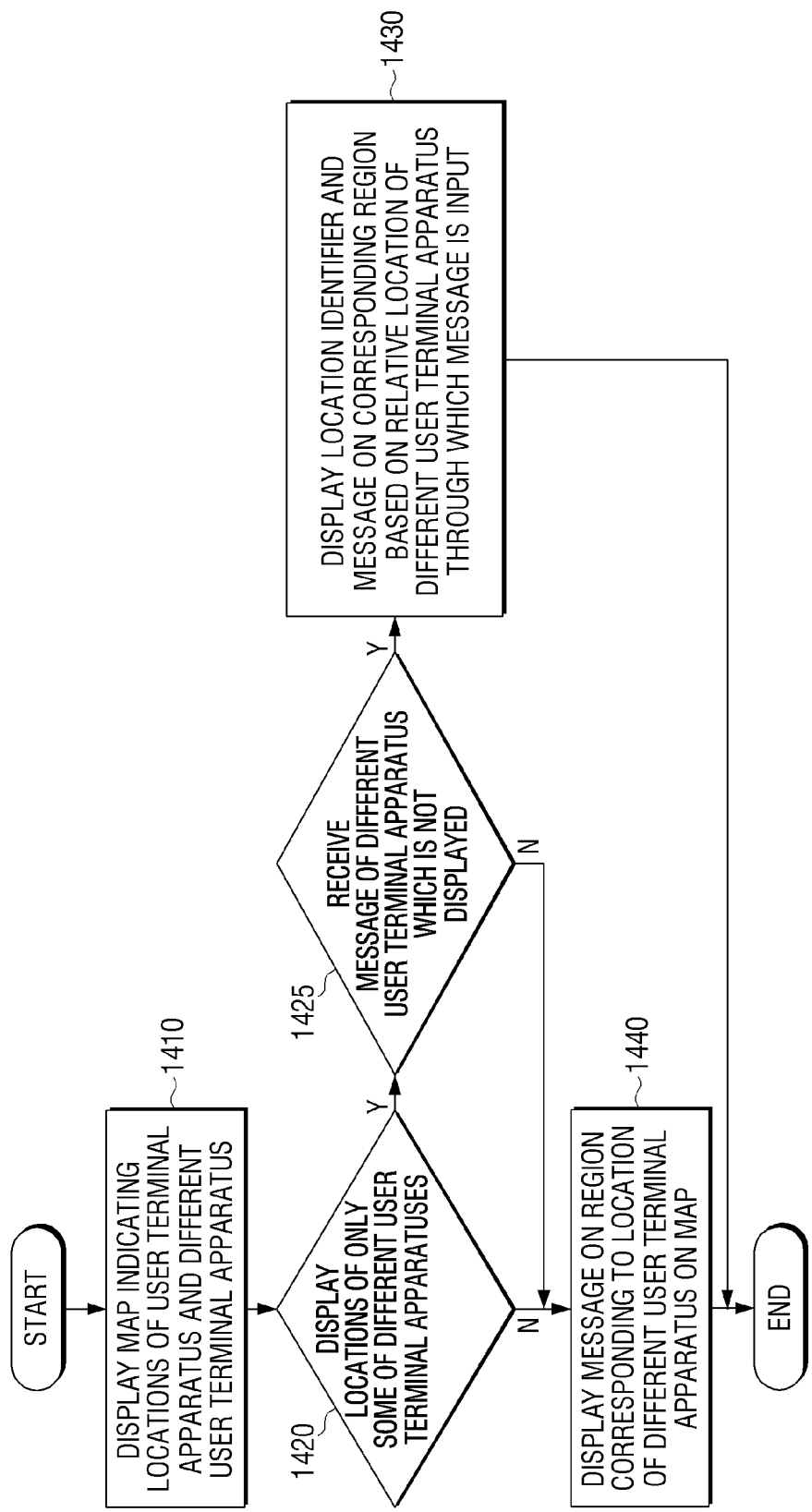

Referring to FIG. 14, when there are a plurality of other user terminal apparatuses, the method may further include: when locations of some of the plurality of other user terminal apparatuses are displayed on the map (S1420) and a message input through one of the plurality of other user terminal apparatuses that is not displayed on the map is received (S1425), displaying a location identifier and the message on a corresponding region on the screen based on a relative location of one of the plurality of other user terminal apparatuses through which the message is input with respect to the user terminal apparatus (S1430). When locations of all of the plurality of other user terminal apparatuses are displayed on the map (S1420), or a message input through one of the plurality of other user terminal apparatuses that is displayed on the map is received (S1425), messages are displayed on regions corresponding to the actual locations of the user terminal apparatuses, on the map (S1440).

Figure 15:
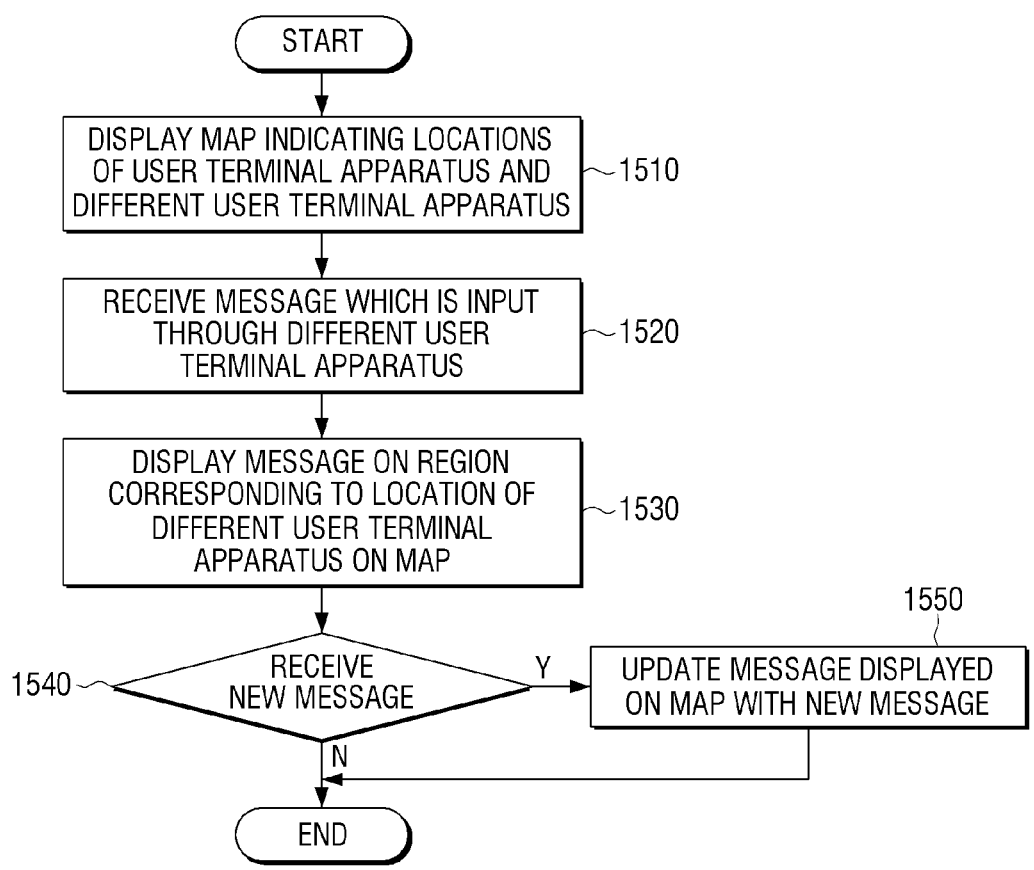

Referring to FIG. 15, when the message is displayed on the map, the method may further include: when a new message input through one other user terminal apparatus is received (S1540), updating the message on the map with the new message (S1550).

Figure 16:
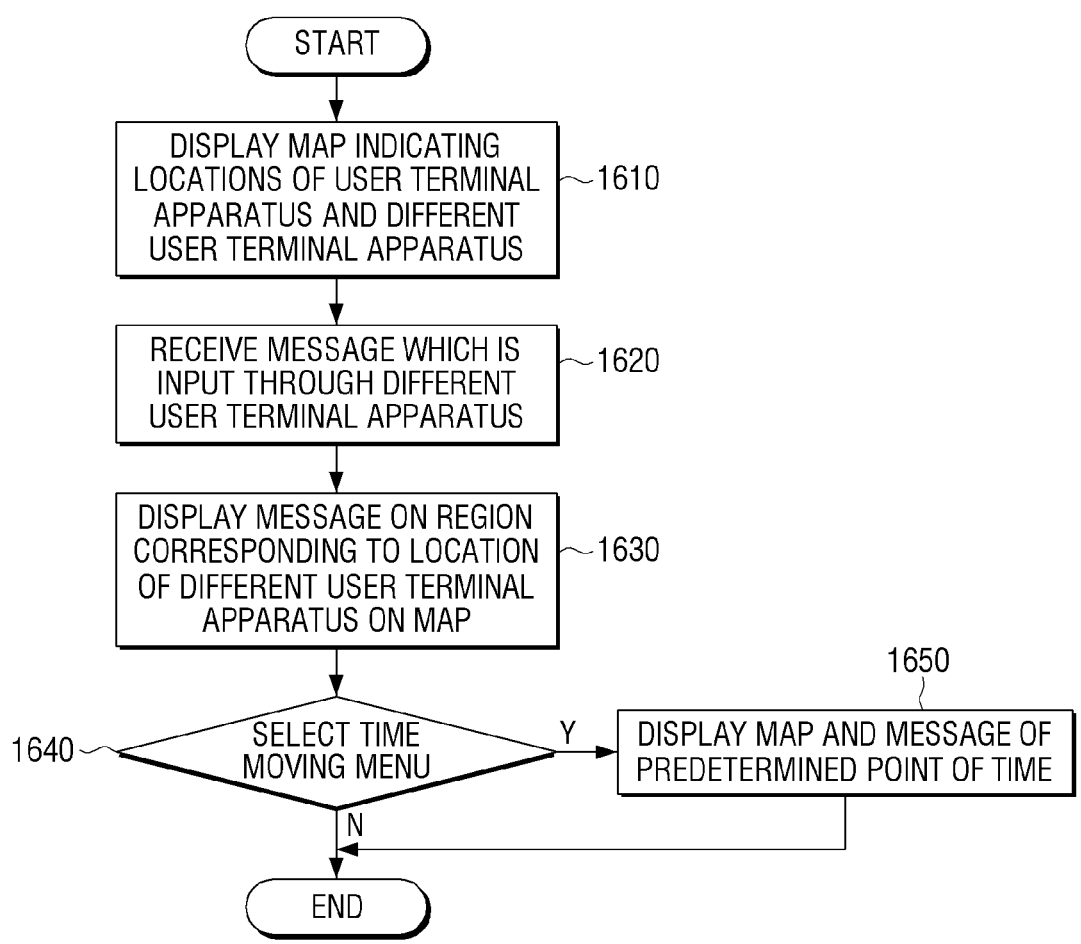

Referring to FIG. 16, the method may further include displaying a time moving menu on a certain region of the screen of the user terminal apparatus (S1630), and, when the time moving menu is selected (S1640), displaying a map and a message of a predetermined point of time (S1650).

Referring to FIG. 17, a method for exchanging a message according to an exemplary embodiment includes: transmitting, by one other user terminal apparatus, terminal location information and a message to a server (S1710), receiving, by the server, the terminal location information and the message from one other user terminal apparatus (S1720), and, when the server stores the terminal location information and the message (S1730), transmitting, by the server, the terminal location information and the message to a user terminal apparatus (S1740). The user terminal apparatus receives the terminal location information and the message of one other user terminal apparatus (S1750), and displays the terminal location information and the message on the screen along with a map (S1760).

As described above, the user terminal apparatus, the message exchange system, the method for displaying the message and the method for exchanging the message, which can allow several users to identify one another's locations and exchange messages with one another, are provided, so that new user experience can be provided by combining a social network and a virtual world providing real world information.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A user terminal apparatus comprising:
a display configured to display a map indicating a location of the user terminal apparatus and a location of at least one other user terminal apparatus;
a communicator configured to receive a message which is input through the at least one other user terminal apparatus; and
a controller configured to control to display the message on a region corresponding to the location of the at least one other user terminal apparatus on the map, when the message is received,
wherein the at least one other user terminal apparatus exchanges the message with the user terminal apparatus
wherein when the location of the at least one other user terminal apparatus is not indicated on the displayed map, the controller is configured to control to display the message on a region of the map corresponding to a virtual location of the at least one other user terminal apparatus.

2. The user terminal apparatus as claimed in claim 1, further comprising an user interface,
wherein, when a message is input through the user interface, the controller controls to display the input message on a region corresponding to the location of the user terminal apparatus on the map.

3. The user terminal apparatus as claimed in claim 1, wherein the controller determines a relative location of the at least one other user terminal apparatus with reference to the location of the user terminal apparatus, and controls to display the location of the user terminal apparatus and the location of the at least one other user terminal apparatus on the map according to the relative location.

4. The user terminal apparatus as claimed in claim 2, wherein, when a zoom-in command is input through the user interface, the controller controls to zoom in on the map with reference to the location of the user terminal apparatus, and, when a zoom-out command is input through the user interface, the controller controls to zoom out on the map with reference to the location of the user terminal apparatus.

5. The user terminal apparatus as claimed in claim 4, wherein, when there are a plurality of other user terminal apparatuses, and when the location of the user terminal apparatus and locations of all of the plurality of other user terminal apparatuses are displayed on the map, and when the zoom-in command is input, the controller controls to display the location of the user terminal apparatus and locations of some of the plurality of other user terminal apparatuses on the map which is magnified according to the zoom-in command, and, when the location of the user terminal apparatus and locations of some of the plurality of other user terminal apparatuses are displayed on the map, and when the zoom-out command is input, the controller controls to display the location of the user terminal apparatus and the locations of all of the plurality of other user terminal apparatuses on the map which is reduced according to the zoom-out command.

6. The user terminal apparatus as claimed in claim 1, wherein, when there are a plurality of other user terminal apparatuses, and when locations of some of the plurality of other user terminal apparatuses are displayed on the map, and the message input through at least one of the other user terminal apparatuses that is not displayed on the map is received, the controller controls to display a location identifier of the at least one other user terminal apparatus and the message on a screen based on a relative location of the at least one other user terminal apparatus to the user terminal apparatus.

7. The user terminal apparatus as claimed in claim 1, wherein, when the message is displayed on the map and a new message input through the at least one other user terminal apparatus is received, the controller controls to update the message displayed on the map with the new message.

8. The user terminal apparatus as claimed in claim 1, wherein the controller controls to further display at least one of user information of the at least one other user terminal apparatus displayed on the map, a transmission time of the input message, and a reception time of the message.

9. The user terminal apparatus as claimed in claim 2, wherein, when a command to select the at least one other user terminal apparatus is input through the user interface, the controller controls to display the map and the message with reference to the location of the at least one other user terminal apparatus which is selected according to the command.

10. The user terminal apparatus as claimed in claim 1, wherein the controller displays a time moving menu on a certain region of the display, and, when the time moving menu is selected, the controller controls to display a map and a message of a predetermined point of time.

11. A message exchange system, comprising:
a first terminal apparatus which transmits terminal location information and a message to a server;
the server which receives the terminal location information and the message from the first terminal apparatus and stores the terminal location information and the message, and transmits the terminal location information and the message which are received from the first terminal apparatus and stored, to a second terminal apparatus; and
the second terminal apparatus which receives the terminal location information and the message of the first terminal apparatus from the server, and displays the terminal location information and the message on a screen along with a map,
wherein the first terminal apparatus exchanges the message with the second terminal apparatus, and
wherein when the terminal location information of the first terminal apparatus is not indicated on the displayed map, the controller is configured to control to display the message on a region of the map corresponding to a virtual location of the first terminal apparatus.

12. The message exchange system as claimed in claim 11, wherein the server further transmits a reception time of the message which is received from the first terminal apparatus and stored, to the second terminal apparatus,
wherein the second terminal apparatus receives the reception time of the message from the server and displays the reception time on the screen along with the map and the received message.

13. A method for displaying a message, the method comprising:
displaying a map indicating a location of a terminal apparatus and a location of at least one other terminal apparatus;
receiving a first message which is input through the at least one other terminal apparatus;
when the first message is received, displaying the first message on a region corresponding to the location of the at least one other terminal apparatus on the map,
wherein the at least one other user terminal apparatus exchanges the first message with the user terminal apparatus, and
wherein when the location of the at least one other user terminal apparatus is not indicated on the displayed map, displaying the message on a region of the map corresponding to a virtual location of the at least one other user terminal apparatus.

14. The method as claimed in claim 13, further comprising:
receiving input of a second message through the terminal apparatus; and
when the second message is input, displaying the input second message on a region corresponding to the location of the terminal apparatus on the map.

15. The method as claimed in claim 13, further comprising:

when a zoom-in command is input through the terminal apparatus, zooming in on the map with reference to the location of the terminal apparatus; and when a zoom-out command is input through the terminal apparatus, zooming out on the map with reference to the location of the terminal apparatus.

16. The method as claimed in claim 15, wherein, when there are a plurality of other terminal apparatuses, the zooming in or zooming out on the map comprises, when the location of the terminal apparatus and locations of all of the plurality of other terminal apparatuses are displayed on the map, and the zoom-in command is input, displaying the location of the terminal apparatus and locations of some of the plurality of other terminal apparatuses on the map which is magnified according to the zoom-in command, and, when the location of the terminal apparatus and locations of some of the plurality of other terminal apparatuses are displayed on the map, and the zoom-out command is input, displaying the location of the terminal apparatus and the locations of all of the plurality of other terminal apparatuses on the map which is reduced according to the zoom-out command.

17. The method as claimed in claim 13, further comprising, when there are a plurality of other terminal apparatuses, and when locations of some of the plurality of other terminal apparatuses are displayed on the map, and a message input through one of the other terminal apparatuses that is not displayed on the map is received, displaying a location identifier of the at least one other terminal apparatus and the message on a screen based on a relative location of the at least one other terminal apparatus to the terminal apparatus.

18. The method as claimed in claim 13, further comprising, when the first message is displayed on the map and a new message input through the at least one other terminal apparatus is received, updating the message displayed on the map with the new message.

19. The method as claimed in claim 13, further comprising displaying a time moving menu on a certain region of a screen of the terminal apparatus, and, when the time moving menu is selected, displaying a map and a message of a predetermined point of time.

20. A method for exchanging a message, the method comprising:

transmitting, by a first terminal apparatus, terminal location information and a message to a server;

receiving, by the server, the terminal location information and the message from the first terminal apparatus;

storing, by the server, the received terminal location information and the message;

transmitting, by the server, the stored terminal location information and the message to a second terminal apparatus; and receiving, by the second terminal apparatus, the terminal location information and the message of the first terminal apparatus, from the server; and displaying, by the second terminal apparatus, the received terminal location information and the message on a screen along with a map, wherein the first terminal apparatus exchanges the message with the second terminal apparatus, and wherein when the terminal location information of the first terminal apparatus is not indicated on the displayed map, displaying the message on a region of the map corresponding to a virtual location of the first terminal apparatus.

* * * * *